United States Patent Office 3,503,500
Patented Mar. 31, 1970

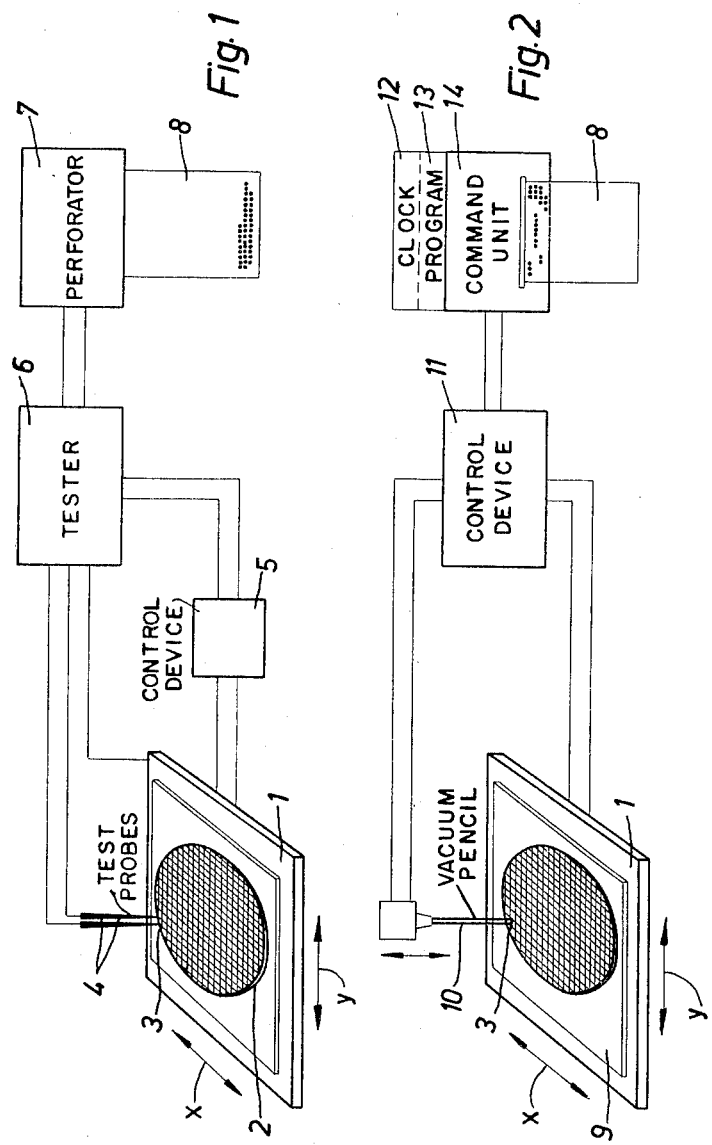

3,503,500
SORTING APPARATUS AND METHOD
Walter Klossika, Raffelter Steige, Germany, assignor to Telefunken Patentverwertungsgesellschaft m.b.H., Ulm (Danube), Germany
Continuation of application Ser. No. 580,442, Sept. 19, 1966. This application Dec. 9, 1968, Ser. No. 788,677
Claims priority, application Germany, Sept. 18, 1965, T 29,430
Int. Cl. B07c 5/344; B07b 15/00
U.S. Cl. 209—74    10 Claims

ABSTRACT OF THE DISCLOSURE

Method and apparatus for testing and sorting out semiconductor elements from a semiconductor wafer containing a large number of semiconductor elements. The elements are successively scanned so as to test their electrical characteristics, whereupon all the test results of each element are stored in numerical form. The elements are then again successively scanned so as to sort them out with the aid of the stored test results and criteria established by a predetermined program.

---

This application is a continuation of my prior copending application Ser. No. 580,442, filed Sept. 19, 1966, now abandoned.

The present invention relates to a method and apparatus for testing and sorting out semiconductor elements from a semi-conductor wafer containing a large number of semiconductor elements, wherein the semiconductor elements are available in an orderly arrangement after the wafer has been scored and broken.

More particularly, the present invention resides in a way of efficiently separating the usable from the unusable semiconductor elements on a semiconductor wafer, this being done, in accordance with the present invention, by automatically scanning the individual elements for testing their electrical characteristics and then storing the test results, the individual elements being sorted out, after a further scanning in accordance with a predetermined program which utilizes the stored test results. This method can be used for further classifying the selected semiconductor elements in accordance with desired characteristics.

Heretofore, planar or mesa semiconductor elements in the semiconductor wafer were tested and then marked accordingly. In the case of the unusable elements destined to become the rejects, for example, this was done by marking the same with ink or with a strong current pulse. What was also done was to use color-coded marking agents, as, for example, inks of different color, to classify the usable elements into different groups. In the case of planar transistors, for example, the same could be grouped according to their current amplification factor, each group being characterized by a particular color.

After the marking steps, the semiconductor wafer was scored, usually with a diamond-tipped scribe, and broken up into the individual elements, these elements, however, remaining in their original positions, so that even after the scoring and breaking operation, the individual elements were classified and lay next to each other. The so-called classifying grid was then examined under a microscope, and the semiconductor elements marked by the color of a given group where then picked out with the help of suction pincers or a so-called vacuum pencil.

The above described operation is time-consuming, tedious and subject to human error, and it is therefore the primary object of the present invention to simplify the heretofore known ways of sorting out semiconductor elements from a wafer containing a large number of individual elements. In accordance with the present invention, this is done by automatically scanning the individual elements to determine their electrical characteristics and to store the test results, whereafter the individual elements are automatically sorted by again scanning them and, with help of the stored data, picking out those elements which have the desired characteristics.

Additional objects and advantages of the present invention will become apparent upon consideration of the following description when taken in conjunction with the accompanying drawings in which:

FIGURE 1 is a schematic illustration of the apparatus for carrying out the electrical testing step.

FIGURE 2 is a schematic illustration of the apparatus for carrying out the sorting step.

Referring now to the drawings, FIGURE 1 shows a so-called Cartesian table 1, that is to say, a table which can be displaced in mutually perpendicular directions as represented by the arrows $x$ and $y$. The table 1 carries an integral semiconductor wafer 2 which contains a large number of semiconductor elements, e.g., transistors or integrated circuits, whose electrical characteristics are determined by test probes 4 the outputs of which are connected to a tester 6. At the start of the measuring operation, the tips of the probes 4 are positioned to engage an element 3, which is arbitrarily selected to serve as the starting point. Next, the apparatus carries out the test program which is stored in the tester 6. The test results obtained in the course of this program and which are taken up in accordance with a given sequence, are digitalized and stored in a memory. In the embodiment illustrated in FIGURE 1, the test results put out by the tester 6 are applied to a punch card perforator 7, the values being written into punch cards 8. After an element has been tested, the table 1 is moved in one of the two possible directions by a distance equal to the width of one element, so that an element adjacent to the first element can now be measured. The table 1 is moved by a control device 5 which itself is controlled by a predetermined program that dictates how the table 1 is to be moved. In details the test probes 4 are lowered to the first element for example pneumatically. When an appointed time given by a timer is passed, the tester 6 begins to carry out the test program. When the test program comes to an end, an electrical signal is given by the tester 6 to the control device 5 for raising the test probes pneumatically and an indexed motor is released which shifts the table 1 by a distance equal to the width of one element. Simultaneously, the stored test results are written into the punch card 8 by the perforator 7. By another signal given by the tester 6 the test probes 4 are lowered again to the next semiconductor element and a new cycle of measurement and storage is beginning. The electrical characteristics of the element which is now engaged by the probes 4 are then tested and the test results stored, in the manner described above.

After all of the elements have been tested and the respective test results stored, the wafer 2 is scored and then broken up into the individual elements. The way in which the scoring and breaking operations are carried out is known in the art and need therefore not be described here. Suffice it to say, that after the scoring and breaking operations, the now separated elements remain in the same positions on the table 1 which they occupied prior to the scoring and breaking, and are ready to be subjected to the sorting phase of the operation.

FIGURE 2 again shows the Cartesian table 1, the same carrying a form 9 which serves as the classifying grid that holds the individual semiconductor elements. A vacuum pencil 10 is placed over the starting element 3. Whether or not this element or any subsequent element with which the vacuum pencil 10 comes into alignment is picked up and transported to the contacting device (not shown) depends on the data which is taken out of the memory, i.e., the card 8, and applied to the command unit 14 and the program 13. The control device 11 is coupled directly with the command unit 14 and moves the table and the vacuum pencil in accordance with the command received from the command unit. The vacuum pencil 10 is also controlled by electrical signals. For that purpose the control device contains logical circuits. For example when the command unit 14 after the exploitation of the measured data on the punch card 8 gives the signal "good" to the control device 11 the vacuum pencil is lowered to the corresponding element and picks it up. Further, the table 1 is moved by a distance equal to the width of one element. When the command unit gives the signal "no good" only the table is moved and the vacuum pencil stays in its raised position. The command unit 14 may be a punch card reader usual in the trade.

A clock 12 is connected with the command unit 14 and causes the measured data, that is to say, the punch card 8 and the table 1 to be advanced in a clockwise manner. The program 13 which has been applied to the command unit 14 determines what test data is to form the basis for the sorting out operation. Thus, the program supplies the criteria in accordance with which the sorting out operation is carried out, that is to say, the program determines what electrical characteristics an element has to have in order to quality it either as a reject or as a usable element in which latter case the element is sucked up by the vacuum pencil 10 and is transported to the contacting apparatus where the element is ultimately made part of a more complete electric circuit.

It will be seen from the above that the method and apparatus according to the present invention enormously simplifies the task at hand. This is due to the fact that the testing and sorting out steps can be carried out completely automatically and also that the testing and sorting out steps can be varied to meet the particular needs of the situation. In particular, thanks to the present invention, a number of the steps which the prior art sorting out processes had to carry out area significantly simplified or even eliminated. Moreover, the steps which the prior art process had to carry out were very time-consuming and inasmuch as these steps are significantly simplified or eliminated, the entire sorting out operation can be carried out much more quickly than was heretofore possible.

In summary, it will be seen from the above that in the process according to the present invention, the automatic sorting takes place after the semiconductor wafer has been scored and broken into the individual semiconductor elements. The test data for the individual elements, however, is determined while the wafer is still unbroken whereafter the wafer is scored and broken, the scoring and breaking steps being carried out in such way that the individual elements will remain in the same position in which they were prior to the breaking of the wafer. The individual elements are then taken out of the sorting grid, either in groups or in pairs, in accordance with the predetermined program.

It will also be seen from the above that both the measuring as well as the sorting steps are carried out completely automatically. The individual elements can be assigned to groups based on various factors. For example, if the semiconductor elements are transistors and the same are to be classified according to their current amplification factor, the transistors will be sorted in accordance with current amplification groups. In the case of other transistors, the sorting criteria can be residual currents, limit frequencies or maximum operating values, in which case the transistors will be classified accordingly.

The present invention is, moreover, suitable for selecting matched transistors.

As described above, the test probes are first adjusted to come into contact with a starting element. After the measuring apparatus has carried out its program and after whatever values are to be measured have been measured, the test probes are automatically moved to the next element, or the test probes themselves can be fixed in space and the table carrying the elements can be displaced. As explained above, the table or the test probes can be advanced in accordance with a control device which itself is under the influence of a given moving program, the entire operation being, in practice, carried out with the help of a clock that pulses the system so as to advance the operation periodically. The characteristics of the semiconductor elements are then measured in the apparatus and appropriate values put out. The output values can be printed out so that after all of the elements of a given wafer have been measured, there is available a complete listing of the characteristics of all of the elements, which can then be utilized, not only for the classifying process but also, for example, for statistical processing. Moreover, all of the measured data put out by the measuring apparatus can be stored. In practice, the measured values are, depending on the program, converted into a series of digital values which can then be stored by digit stores in any one of many ways known to the art. For example, the method according to the present invention can store the information not only on punch cards, but also on punch tape, magnetic tape, disk stores, drum stores, core stores or photo stores.

It will also be seen from the above that in the course of the sorting operation, it is the vacuum pencil which is now positioned with respect to the first element. The table, together with the semiconductor elements on it, is again moved automatically with the help of the control apparatus, through a distance equal to the width of one of the elements in the direction of one of the Cartesian coordinates. At the same time, after the vacuum pencil has sucked up the elements to be sorted out, it carries out its prescribed movement. The table is moved in synchronism with the feeding in of the measured data into the command unit with which the control apparatus is associated. The command unit is connected with a clock which determines the rhythm in which the table is moved and also the rhythm in which the measured data of the next element is taken out of the store. The command unit must have available, at the same time as it receives the measured data, a program which makes certain requirements of the measured value. For example, the program can be such that the controlled vacuum pencil picks up and transports to a contacting device only those transistors whose current amplification value falls in the region of a given group. After all of the transistors of this group have been sorted out, the program can call for transistors having a different amplification factor to be sorted out. Moreover, the program can be such that the vacuum pencil first picks up an element having a given current amplification factor and then picks up a second element having the same current amplification factor, whereupon both transistors are transported for assembly into a unit requiring matched transistors. Another program can see to it that only those transistors which meet certain specifications are picked up by the vacuum pencil and moved to the contacting unit or are transported to a collector site while rejects remain on the table.

Nor is the present invention limited to the use of a vacuum pencil as the removing unit that serves to pick up the individual elements. For example, elements can be picked up by means of pins which are stuck into the elements and are used to remove them from the table. As a practical matter, the use of needles or pins for picking up elements will generally be limited to situations where rejects are to be taken out of the sorting lattice.

If the memory is of the erasable type, as is the case in core, belt or plate-type memories, the stored information can be erased after the information has been utilized by the command unit. This means that available storage cells are free which can immediately take up new data of a different wafer coming from the tester.

The present invention makes it both possible and practical to classify elements into much finer groups than was heretofore possible, simply by color-coding the elements. Indeed, the need physically or otherwise to mark the elements themselves is completely eliminated inasmuch as after the elements have been tested, the test data is stored and need therefore not be indicated on the elements themselves.

It will be understood that the above description of the present invention is susceptible to various modifications, changes, and adaptations.

I claim:

1. A method of testing and sorting out individual elements of a semiconductor wafer, comprising the steps of:
    (a) successively scanning the elements for testing their electrical characteristics and storing the test results of each in numerical form, said test results of each being a plurality of numerical values which represent said electrical characteristics;
    (b) thereafter again successively scanning the elements for sorting out the same, with the help of the test results stored during step (a), in accordance with criteria supplied by a predetermined program.

2. The method defined in claim 1 wherein step (a) is carried out while the semiconductor wafer is an integral entity incorporating the elements and step (b) is carried out after the semiconductor wafer has been scored and broken up into the individual elements, the latter remaining in the same relative position which they occupied prior to the breaking of the semiconductor wafer.

3. The method defined in claim 1 wherein the elements are transistors and the criterion supplied by the program is the current amplification factor.

4. The method defined in claim 1 wherein the elements are sorted out to separate usable elements from rejects.

5. Apparatus for testing and sorting individual elements of a semiconductor wafer, comprising, in combination:
    (a) means for successively scanning the elements to test their electrical characteristics and produce a plurality of measured values for each element which represent said electrical characteristics;
    (b) means connected to said testing means for producing a memory in which the test results of each element are stored; and
    (c) means for successively scanning the elements and being connected to receive the test results stored in said memory for removing those elements whose electrical characteristics, as per the data received from said memory, meet predetermined criteria.

6. Apparatus for testing and sorting individual elements of a semiconductor wafer comprising, in combination:
    (a) a movable table carrying the semiconductor wafer;
    (b) a tester for testing the electrical characteristics of the elements, said tester having test probe means arranged above said table for engaging the particular element with which said test probe means are aligned and a control device for moving said table for successively bringing each of the elements to be tested into alignment with said probe means;
    (c) means connected to the output of said tester for producing a memory in which are stored the electrical characteristics of the elements tested by said tester;
    (d) means for removing individual elements from said table, said removing means having a removing unit arranged above said table for removing the particular element with which said removing unit is aligned and a control device for controlling said removing unit and for moving said table for successively bringing each of the elements to be removed into alignment with said removing unit; and
    (e) a command unit connected to said control device of said removing means and being responsive to a program which supplies the criteria in accordance with which the elements are to be sorted out as well as to said memory produced by said means (c) for causting said removing means to remove only those elements whose electrical characteristics, as per data received from said memory, meet the criteria dictated by said program.

7. Apparatus as defined in claim 6 wherein said table is a Cartesian table and each of said control devices displaces said table in the directions of the Cartesian coordinates.

8. Apparatus as defined in claim 6 wherein said removing unit is a vacuum pencil.

9. Apparatus as defined in claim 6 wherein said memory is in the form of one of the following: punch card, punch tape, magnetic tape, disk store, drum store, core store, photo store.

10. Apparatus as defined in claim 6, further comprising a clock connected to said command unit for causing the latter to operate said control device of said removing means in a stepwise manner.

References Cited

UNITED STATES PATENTS

| 3,185,927 | 5/1965 | Margulis et al. | |
|---|---|---|---|
| 3,344,351 | 9/1967 | Simonyan et al. | |
| 3,410,401 | 11/1968 | Drop | 324—158 X |

OTHER REFERENCES

IBM Technical Disclosure Bulletin, vol. 6, No. 9, February 1964, W. O. Aruschel, pp. 53 and 54.

ALLEN N. KNOWLES, Primary Examiner

U.S. Cl. X.R.

209—81